Sept. 12, 1950        P. H. KURTZ        2,521,922

WELDED METAL REEL

Filed Nov. 8, 1947

INVENTOR
P. H. KURTZ
BY
ATTORNEY

Patented Sept. 12, 1950

2,521,922

UNITED STATES PATENT OFFICE 2,521,922

WELDED METAL REEL

Paul H. Kurtz, Elmhurst, Ill., assignor to Western Electric Company, Incorporated, New York, N. Y., a corporation of New York Application November 8, 1947, Serial No. 784,818

2 Claims. (Cl. 242—123)

This invention relates to reels and more particularly to welded metal reels.

It is an object of the present invention to provide an improved reinforced metal reel of welded construction.

In one embodiment of the invention, the reel has a cylindrical drum with a two-piece head at each end thereof comprising a flat annular disc having an outer cylindrical flange and a circular aperture of substantially the same size as the interior of the drum and an annular reinforcing disc formed to provide spaced annular portions engageable with the outer face of the flat disc and welded thereto and having a cylindrical flange on the inner edge thereof extending through the aperture in the flat disc and engaging the periphery of the end portion of the drum and welded thereto.

Figure 1:
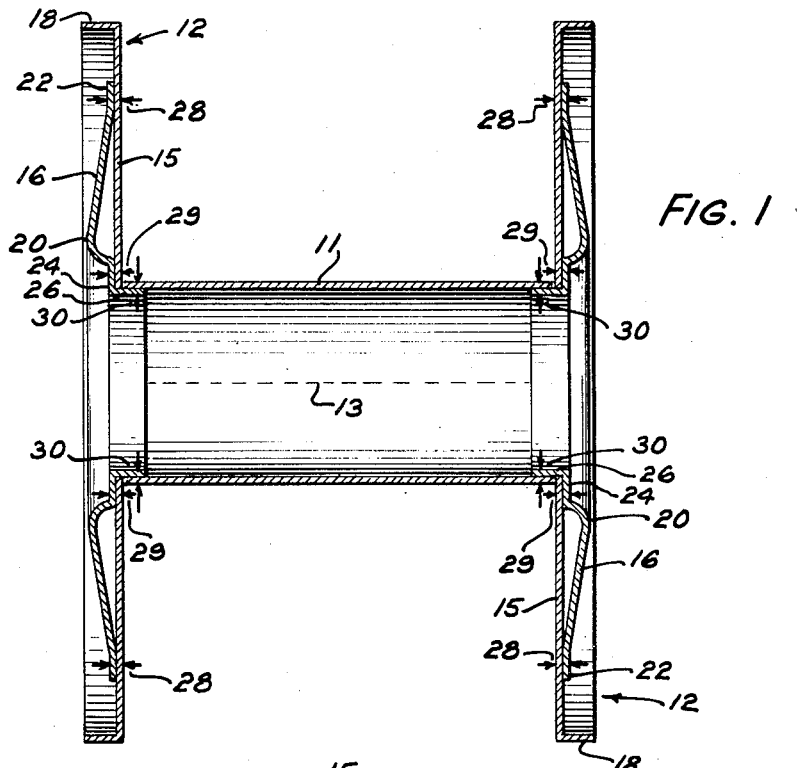
Figure 2:
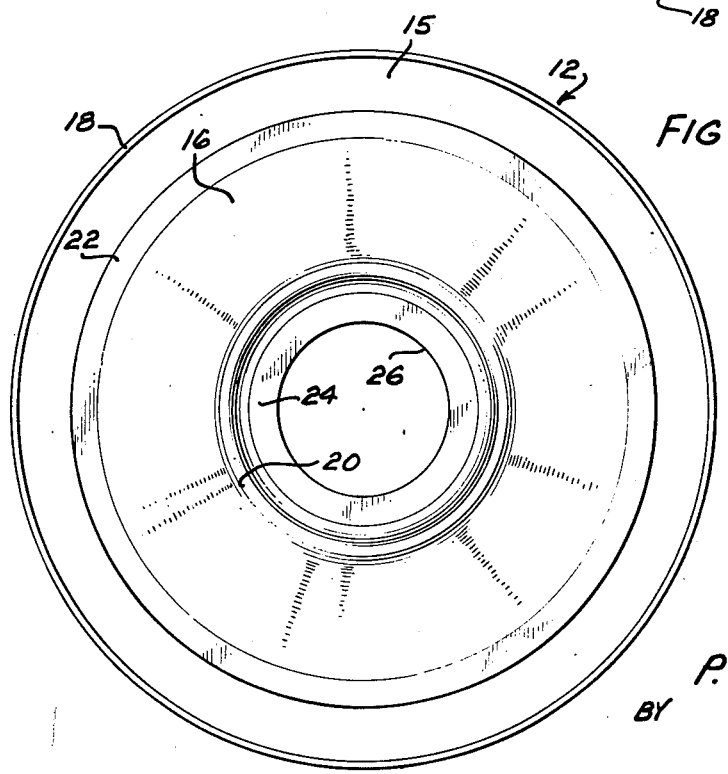

The invention will be more fully understood by reference to the following detailed description thereof and the accompanying drawings illustrating a preferred embodiment thereof in which Fig. 1 is an axial sectional view through the reel and Fig. 2 is an end elevational view thereof.

The reel, which may be used for supporting switchboard wire or cable or other material in the form of strand or cable, comprises a drum 11, to the ends of which are secured composite heads 12. The drum 11 is cylindrical in shape with open ends and is made from a flat sheet of metal formed into cylindrical shape and welded along the line of juncture 13 of the meeting edges.

The composite head 12 comprises an annular sheet metal member or disc 15 and an annular reinforcing sheet metal member or disc 16, which serves to reinforce the member 15 and to attach the head to the drum. The member 15 is a flat annular disc having a cylindrical rim or tire flange 18 and an axial aperture of substantially the same size as the interior of the drum. The reinforcing member 16 is smaller in diameter than the member 15 and has its intermediate portion 20 dished to increase its strength and to form flat outer and inner coplanar annular portions 22 and 24, respectively, engageable with the outer flat surface of the member 15 and an annular intermediate portion spaced from the member 15. The disc 16, at its inner edge, is provided with a cylindrical flange 26 of a size adapted to pass through the aperture in the member 15 and engage the inner periphery of the drum.

In fabricating the reel, the members 15 and 16 may be assembled and spot welded together at annularly disposed points 28 and 29 and the reinforced composite head thus formed may be assembled onto the drum with the flange 26 telescoping within the inner surface of the drum, after which the flange 26 may be spot welded to the drum at a series of circumferentially disposed points 30.

The member 16, being annularly bonded to the member 15 at radially spaced points and having its intermediate wall portion spaced apart from the member 15, forms an annular double-walled construction with the wall 15 and imparts a great deal of rigidity and strength to the composite head thus formed. The composite head, with its cylindrical flange 26, is easily assembled in telescoping relation with the drum and welded thereto. Thus, it will be seen the component parts of the reel may be readily assembled and bonded together by a series of spot-welding operations to form a sturdy reel of simple construction.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A reel comprising a metal cylindrical drum and heads on each end of the drum, each of said heads comprising an annular flat metal disc having a cylindrical rim flange thereon and an axial aperture substantially of the same size as that of the drum, an annular reinforcing sheet metal member having a plurality of annular concentric coplanar portions spaced from the rim flange and in engagement with the disc and bonded thereto and having the annular portion between said coplanar portions disposed in spaced relation to said disc to form a hollow double wall construction with said disc, and a cylindrical flange on the inner edge of the annular reinforcing sheet extending in telescoping engagement with said drum and bonded thereto.

2. A reel comprising a metal drum and heads on each end thereof, each of said heads comprising a flat annular metal disc in abutting relation to the end of the drum and having a cylindrical rim flange and an axial aperture substantially of the same size as that of the drum, an annular reinforcing sheet metal member of irregular shape in cross section having its radially intermediate annular zone spaced from the disc and having its radially inner and outer annular zones in engagement with and bonded to the outer face of the disc, and a cylindrical flange on the inner edge of the annular reinforcing member extending through the aperture of the disc with the inner periphery of the disc abutting against the outer surface of the flange and into telescoping engagement with the drum and bonded to said drum.

PAUL H. KURTZ.

REFERENCES CITED

The following references are of record in the file of this patent:

UNITED STATES PATENTS

| Number | Name | Date |
|---|---|---|
| 1,484,153 | Peterson | Feb. 19, 1924 |
| 1,528,985 | Odquist | Mar. 10, 1925 |
| 1,816,651 | Mossberg | July 28, 1931 |
| 2,272,156 | Olson | Feb. 3, 1942 |
| 2,344,132 | Coxe | Mar. 14, 1944 |
| 2,392,612 | Olson | Jan. 8, 1946 |